United States Patent [19]
Cameron

[11] Patent Number: 5,915,810
[45] Date of Patent: Jun. 29, 1999

[54] TELESCOPING MEASURING STICK WITH AIR DAMPED CLOSURE AND FRICTIONAL LOCKING

[76] Inventor: Bruce Cameron, P.O. Box 12, Manchester, Me. 04351

[21] Appl. No.: 08/859,918

[22] Filed: May 21, 1997

[51] Int. Cl.$^6$ ....................................................... G01B 3/08
[52] U.S. Cl. ............................... 33/809; 33/295; 33/296; 33/DIG. 2
[58] Field of Search ............................... 33/809, 293, 295, 33/296, 806, 810, 811, 812, DIG. 2

[56] References Cited

U.S. PATENT DOCUMENTS

| | | |
|---|---|---|
| D. 362,399 | 9/1995 | Cameron .................................. D10/62 |
| 3,492,737 | 2/1970 | Swanson .................................. 33/809 |
| 4,318,228 | 3/1982 | Kimura .................................... 33/809 |
| 4,399,616 | 8/1983 | Jansson .................................... 33/809 |
| 4,471,532 | 9/1984 | Francis .................................... 33/809 |
| 4,621,431 | 11/1986 | Fatool et al. ........................... 33/809 |

*Primary Examiner*—Christopher W. Fulton

[57] ABSTRACT

A fixed length telescoping measuring stick that is self supporting and includes an inner telescoping ruler and two-way level combination. A divided encasement comes together via an air-damped cushion provided by a controlled release air lock that is automatically effective to protect the user. This air cushion damper is in combination with a friction position locking knob for either right or left handed users.

23 Claims, 5 Drawing Sheets

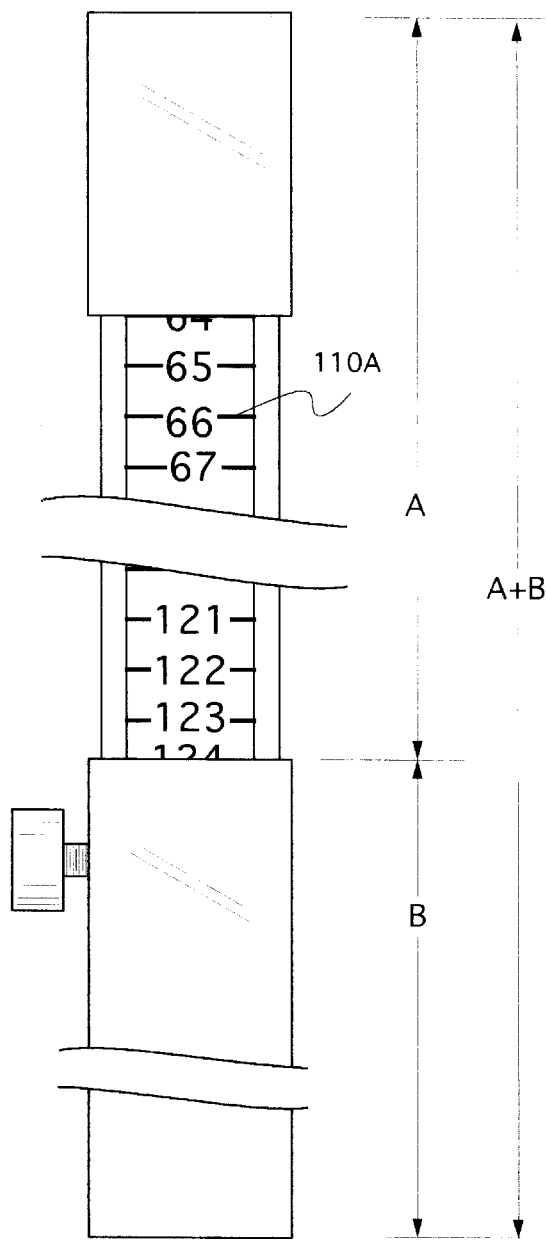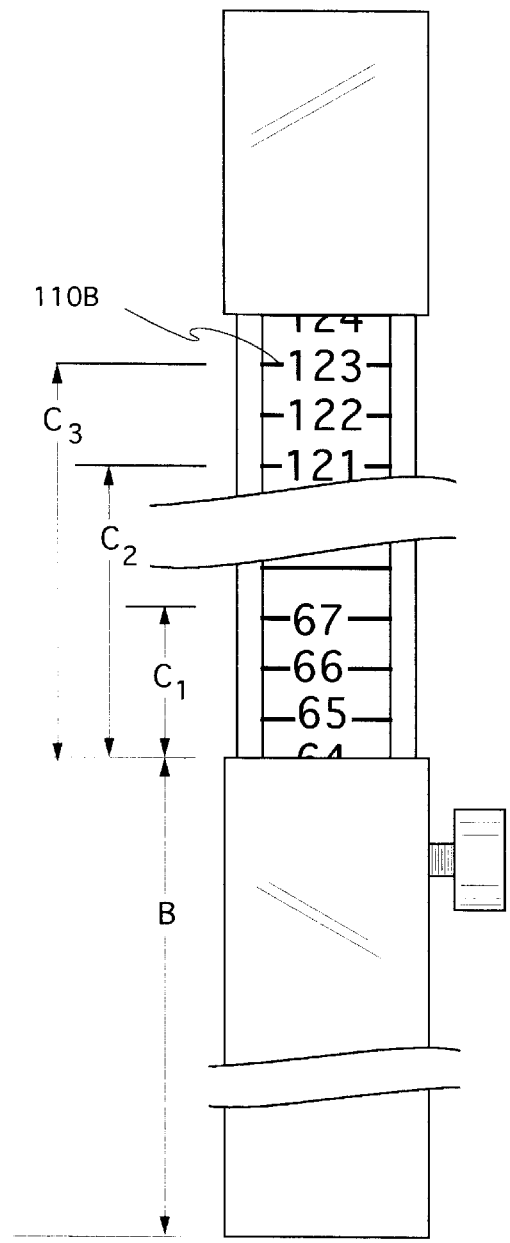
Figure 4A
Figure 4B

TELESCOPING MEASURING STICK WITH AIR DAMPED CLOSURE AND FRICTIONAL LOCKING

BACKGROUND OF THE INVENTION

Field of the Invention

The field of this invention relates to a method and apparatus for measuring between objects or between planes, such as floor to ceiling, wall to wall and the like.

Further, the field of the invention relates to a measurement from one object or plane upward or outward in survey fashion.

Additionally, the invention relates to the field of self supporting telescoping measuring rules within a protective casing that is provided with frictional drag locking and air cushioned damping upon closure.

EXPLANATION OF TERMS

Certain terms are used to explain the background of the art and the invention; and, for convenience and completeness sake, these terms are summarized in this section. Such terms are not meant to supersede the claims; but, rather, are meant to further the understanding of the invention and briefly introduce the stage for a detailed teaching of the improvement in the art as provided by this invention.

Such terms include the following:

Inside Measurement (Plane to Plane).

Contractors for years have extended upwardly a steel tape while trying to estimate awkward-to-measure upward distances such as floor to ceiling, beams, rafters and the like. In many horizontal unsupported measurements, two men are need for a simple measurement. Such measurements are not only hard to read, but often the steel tape sags or folds back upon itself resulting in failure.

This self supporting measuring stick provides a highly precise inside measurement from, for example floor to ceiling. Being self supporting the stick will measure an unsupported side to side distance with precision. An inside measurement is a direct and precalculated reading, in conventional units, set forth on one side, called side A herein, of the telescoping inner rule. A protective outer case includes graduated scales and two-directional leveling for additional precise measurement readings.

Offset Measurement (One level upward).

An offset measurement is taken relative to a single plane rather than between two planes as in the inside measurement. Such offset measurements are often used in surveying, determining basement grades and the like. Such an offset measurement from one level is normally read by another device or is used as a precise guide to a desired nailing location in contractor work. Thus a lumber item such as a timber, temporarily fixed at one end, can be slid along the sturdy measurement stick and that timber may be fixed or nailed at command at a particular measured point as desired. Offset measurements are made using the scale on the reverse side, or side B of the rule.

Graduated Markings.

Whether english, metric or other type of scale is to be predetermined and used, precise measurements require graduated marking in the conventional scale of familiarity for the user. The encased measuring tool of this invention provides several positional locations for graduated scales, each of which may include measurements running various directions, and thus affording the user a plurality of measurement opportunities in a single convenient tool. Such measurement capabilities are also combined with levelling features conveniently located on a sturdy outer casing that houses the telescoping measurement rule. Graduated markings, whether in inches, feet, yards, meters etc. provide markings that are available for the user to see, record and rely upon for several diverse types of measurement.

Encased Telescopic Measuring Device.

Contractors and surveyors are both alike in many ways when it comes to tools. While their livelihood depends upon them, such tools are handled roughly and sometimes are abused during use. A measurement rule housed within a protective covering is an advantageous feature which guards against tool damage. Any attempt at encasement, prior to this invention, had previously been viewed as a serious detriment rather than a highly advantageous feature. An outer protective encasement affords diverse visual measurements, leveling capabilities and does so without subjecting the user to pinched fingers, blood blisters and similar in-field-usage dangers. A separable encasement with dual-handed manual friction lock and automatic air-damped cushioning features yields many advantages in use, flexibility and ease of handling.

Air Damped Cushion.

An encasement, to be effective must of necessity have some bulk and weight otherwise the outer shield cannot accomplish its protective objective. A divided case, when separated and fully extended, represents significant momentum and presents the possibility of harm to the user as the divided encasement comes together during tool closure.

An air-damped cushion (sometimes referred to as a controlled release air lock) is automatically effective to protect the user. This cushion—especially when combined with manual frictional locking features—is highly advantageous and is provided by the measurement tool of this invention. Such a cushion prevents the inner telescoped measuring element and its connection to an elevated portion of the divided casing from slamming shut during usage.

Case Length and Numerical Scale Sequences.

A. Inside Measurement.

For an inside measurement—that is a measurement from the bottom of the case, through an extended rule portion and including the cap of the case—the total closed length of the case "CL" must be taken into account for the numbering sequence on side A of the stick. Accordingly, the numerical values showing on side A of the inner rule are adjusted for the length of both the cap and base portions of the case.

B. Case Length (One Example.).

An example is believed to be helpful at this point. Let the length of the base portion of the case be taken as "B" (64 inches in our example) and the length of the cap portion be taken as "C" (4 inches) then, for inside measurements, the scale numbers appearing at a READ line on the inner rule start with a numerical value of "B" plus "C", i.e. the total closed length, "CL" of the case (68 inches, total). Moreover, the first number of an advancing numerical sequence starts with a value of CL or 68 inches at the cap of the rule, and progresses down the rule with an increasing numerical sequence as the telescoping of the rule is extended, and more and more of side A of the inner rule becomes visible. For a ten foot rule, then, the READ line for side A would show 124 inches when the stick is almost fully extended.

C. Offset Measurement.

In an offset measurement, however, only the length of the base must be accounted for, and thus the scales on the reverse side, or side B, of the inner rule start at a different numerical value and run in the opposite direction.

In the case of an offset measurement the top, or cap, portion of the case may be ignored for purposes of the commencement of the numerical sequence. The numerical value on the inner rule is set by locking the scale in a predetermined position before any reading is taken. Thus, the scale on side A is first extended so that one reads on side A at the READ line the total rule capability—that is ten feet or 124 inches.

A transit will be viewing side B and on that side, another advancing numerical sequence is involved which has as its first number at the top edge of the base portion a number starting with 64 and $\frac{1}{16}$ inches in our assumed example. This side B sequence runs with increasing number values up the scale toward the cap of the stick where the number 124 inches or ten feet is available for transit readings.

Air Release Passage.

Automatic air cushioned closing of the inner rule, that has earlier been telescoped out for measuring, is assured by an air release opening or passage for a column of trapped air formed within the lower section of an essential airtight casing. The trapped column of air is automatically bled away from the casing along a recessed scale groove such that the divisible encasement portions will slowly but effectively cushion together without potential harm to the user.

MANUAL FRICTION DRAG AND/OR LOCK

Many known types of friction locks are, of course, available on measuring devices. But, the combination of such a lock with an air cushion closing of separable portions of an outer protective encasement shield is not known and is a highly advantageous feature for the user. The tool of this invention is particularly adaptable to a requirement to stopping measurements in "mid-stream" so to speak. Hard material inserts, such as smooth acrylic, for example, run along the center of the longitudinal side edges of the inner rule. A smooth rounded end of the friction knob engaging such an insert may be user-adjusted with just the right pressure so as to act either as a frictional drag or as a frictional lock. Manual friction locking holds an extended measurement in a fixed location until the friction lock is released. This easy-to-use drag lock is located through the protective encasement and bears either against the insert or a side surface of the inner rule. Both right and left-handed frictional drag locking is available.

DESCRIPTION OF PRIOR ART

I have been granted a Design Pat. No. 362,399 issued on Sep. 19, 1995 for an earlier variation of my invention. Listed in that Design patent are several United States references including Jansson U.S. Pat. No. 4,399,616; Simpson U.S. Pat. No. 4,754,553; Czopor, Jr. U.S. Pat. No. 4,863,022. Also cited are Swanson U.S. Pat. No. 3,492,737; Koulichkov U.S. Pat. No. 2,058,998; Moore U.S. Pat. No. 3,094,787; and Giroux U.S. Pat. No. 4,203,227. Although disclosing telescoping rulers, such prior art devices as therein disclosed do not have a divided outer protective encasement, simple frictional locks, air-damped cushioning nor diverse types of measuring devices all encompassed in one tool for several heretofore unknown features.

SUMMARY OF THE INVENTION

My measuring tool invention, as disclosed and claimed herein, is comprised of a rectangular inner telescoping member that is snugly but slidably fitted into a divided hollow rectangular extrusion. The extrusion serves several functions including a protective outer casing, a pair of level housing surfaces and graduated ruler surfaces, as well.

The measuring tool is marked with standard graduated ruler markings on opposed recessed sides of an inner rule. Such sides on the inner telescoping member provide two separate types of accurate distance measurements—one measurement taking into account the predetermined length of the hollow extrusion—and, another, continuing on from—and taking into account—the length of the base section of the casing. Opposed recessed sides of the telescoped inner rule are each marked with a scale numbered respectively for single plane (offset measurements) and inside (plane to plane) measurements. One tool thus provides the same function as survey rods, leveling, and inside measurements and well as providing the more standard length measurement along the flat casing surfaces.

The device is further affixed with horizontal and vertical leveling bubbles as a collateral attribute. One two-way level is affixed to the upper cap portion of the casing so that it is readily available for plumbing the stick by a user at an elevated position such as the top of a ladder. Another two-way level is affixed to the lower base portion of the casing where it may easily be read by one standing on a lower level. The purpose of both levels is to assure either a vertically plumb reading or a level horizontal reading. Of course, both levels serve their normal leveling function for the case 114 since such levels are accurately mounted on the rectangular case.

The longer base section of the casing houses an air cushion and a frictional stop for the shorter elevated upper portion that is fastened to the inner rule and telescopes with that inner rule. When involved in either survey or inside type measurements, the divided casing separates lengthwise; and once extended, for either type of measurement, automatically cushions itself for closure due to an air-damped closure system built into the tool. A simple, dual-handed frictional locking is readily available to hold a telescope rule at any fixed position during measurements.

OBJECTS OF THE INVENTION

It is an object of the invention to provide a divided hollow extrusion of fixed length for receiving an inner measuring device and serving as a protective encasement for said inner rule.

It is an object of the invention to provide a method of measuring between objects and/or between planes by a graduated scale that is placed on said inner rule and which takes into account the respective length of a divided encasement.

It is an object of the invention to provide a method and apparatus for measuring between objects or between planes by a graduated scales that are placed on said opposing sides of the inner rule and which takes into account the respective length of a divided encasement It is an object of the invention to provide a measurement from one object or plane upward or outward in survey fashion together with one measurement between planes.

It is an object of the invention to provide an air cushioned damping upon closing, and an encased measuring rule having close fitted, internally telescoping measuring scales.

It is an object of this invention to provide an outer protective encasement which afford diverse visual measurements and leveling capabilities.

It is an object of the invention to adapt an encased tool for measuring that provides protection for the user against pinched fingers, blood blisters and similar in-field-usage dangers.

It is yet a further object of this invention to provide an dividable encasement with dual-handed manual lock and automatic air-damped cushioning features.

It is yet one further object of this invention to provide automatic air cushioned closing of the inner rule that has been telescoped out for measuring by virtue of an air bled damper having a release opening or passage for a column of trapped air formed within the bottom of an essential airtight casing extrusion.

It is yet one additional object of this invention to provide a release passage for a trapped column of air which will permit the trapped air to be automatically bled away from the casing along at least one recessed groove in an inner rule telescoped within the casing.

It is yet one further object of this invention to provide a trapped cushion of air that is slowly released such that the divisible encasement portions of a measuring stick will slowly but effectively cushion together without potential harm to the user.

BRIEF DESCRIPTION OF DRAWING

FIG. 4 includes FIGS. 4A and 4B which, respectively are side views of operating modes of the measurement tool of my invention which when compared with FIGS. 3A and 3B promote a clearer understanding of this my invention;

DESCRIPTION OF PREFERRED EMBODIMENT (S)

Figures 1A, 1B:
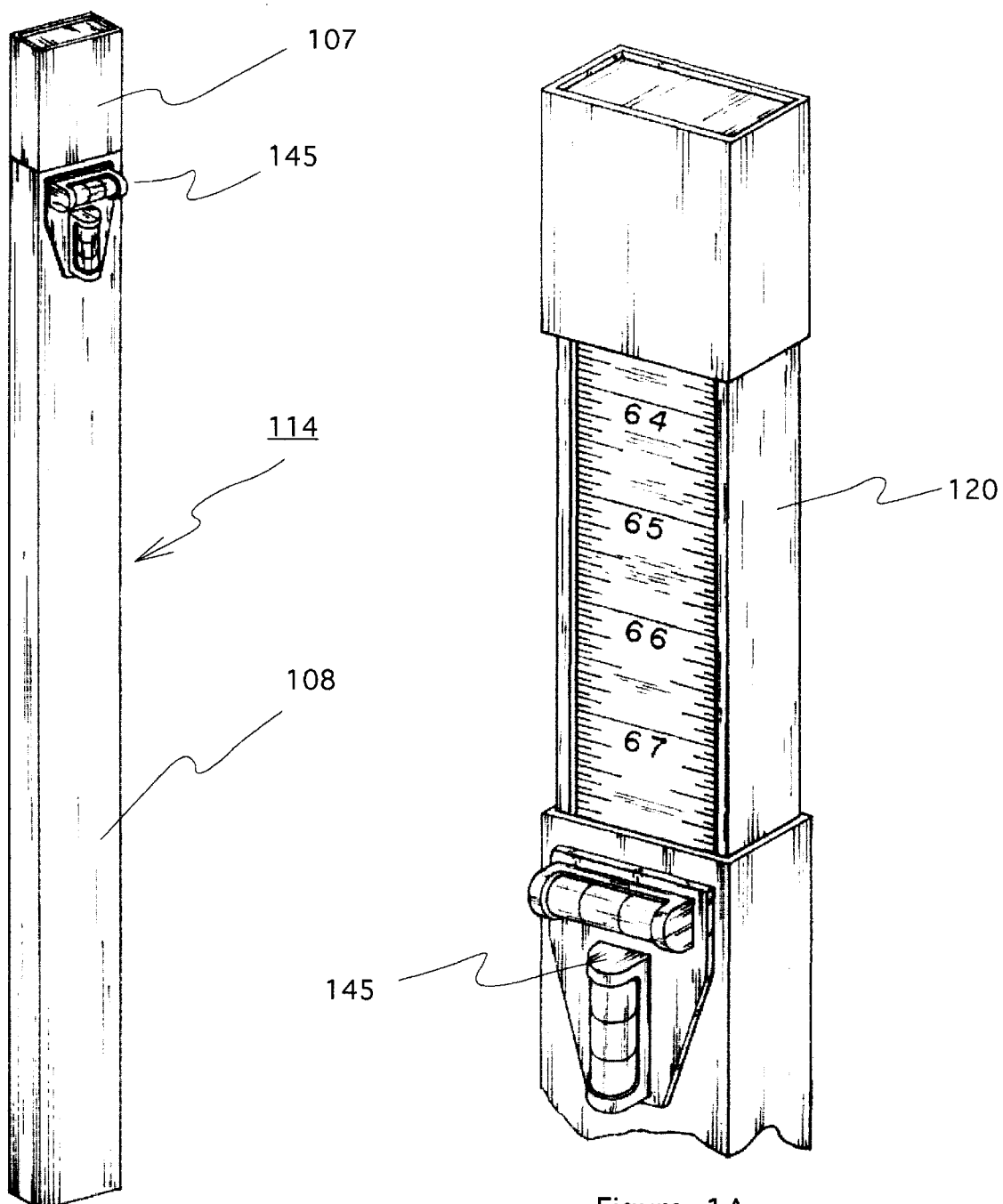
FIG. 1 includes FIGS. 1A and 1B as prior art figures from my own Design Pat. No. 362,399 issued on Sep. 19, 1995.

FIG. 1 presents the overall and top-most portions of measuring stick 100 as depicted in my earlier Design patent. Measuring stick 100 is capable of side to side use; but, finds its most advantageous use in a vertical position as shown in FIGS. 1A and 1B taken from my Design Patent. Measuring stick 100 is comprised of two major telescoping components, inner rod 120 and hollow, outer extrusion 114. The encasement outer extrusion 114 is divided into a top cap portion 107 and a lower base portion 108. For smooth and straight telescoping operations, inner telescoping rod 120 is slidably fitted within the hollow extrusion 114. Inner rod 120 is further provided with standard ruler markings 110 on one side.

Markings 110 are specifically positioned along the inner member 120 such that a specific length or distance number is correctly related to the true distance between objects, such as a floor and ceiling, when such length numbers are viewed by alignment with top edge 119 of base extrusion portion 108. Operationally, a telescoping device such as my invention requires an upper cap end 107 that is suitably fixed or attached to the telescoping inner rule 120.

When measuring stick 100 is closed, the bottom edges of top cap 107 mate evenly with the upper edges of base portion 108 as shown best in FIG. 1B. With such a configuration, when collapsed or in a closed position, the unit 100 appears as a single member device. A two-way level unit 145 is placed on casing 114 for use in more precisely determining when a measurement is truly vertically or horizontal aligned for the measurement in question.

The fine line juncture of the cap end 107 where it meets the lower base casing 108 can become an awkward handling point and could in fact pinch fingers of the user. Please note that when used in an extended vertical position the measuring stick 100 may extend upward to ten feet (or higher depending upon the lengths selected for the base 108 and the cap 107). Therefore, I have perfected an air cushion and frictional stop/drag method and apparatus for overcoming this potential shortfall, and for automatically performing smooth, repeatable, steady measuring operations that do not place the user at any risk.

Figure 2C:
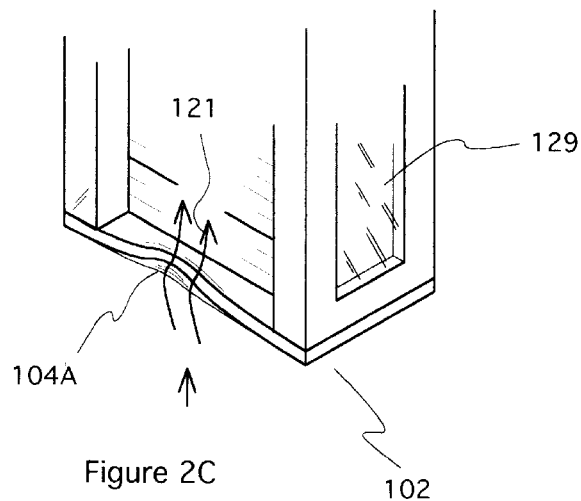
FIG. 2 includes FIGS. 2A, 2B and 2C which are partial perspective cutaway views of alternate embodiments of the air damper at the bottom portion of my utility measurement tool invention.
Figure 2B:
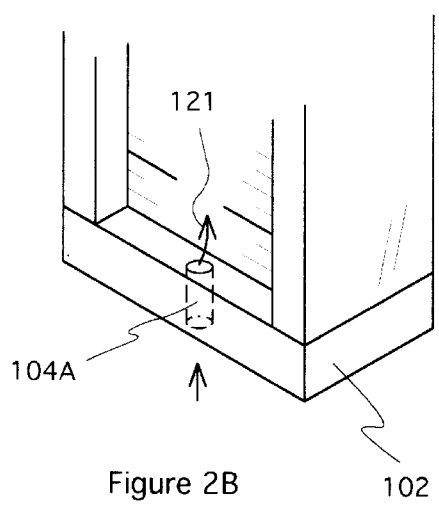
Figure 2A:
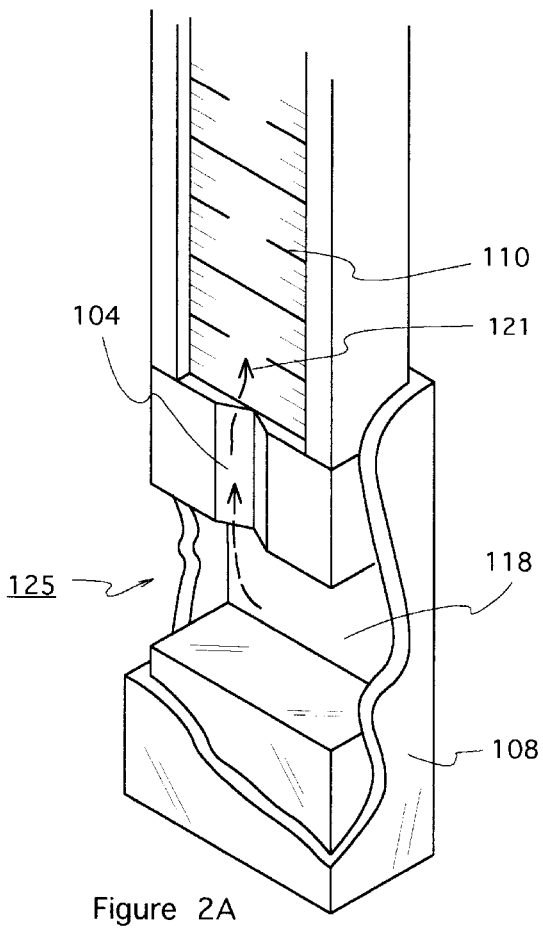

My air cushion feature may take several forms, and two representative forms are best shown and described with respect to the cutaway front perspective views of FIGS. 2A and 2B. In FIG. 2A, the lower stick end and corresponding air cushioning aspects of my measurement stick 100 are presented in an isometric view. Inner member 120, as previously discussed, is slidably fitted within the lower base casing 108 of hollow extrusion 114. The lowest portion of base member 107 is sealed at the bottom by a block 201.

Assume for purposes of description that the measurement stick 100 has been extended several inches above the read line 119 as shown, for example, in FIGS. 1A or 4A. Thus, the bottom of sole 102 located on inner rule member 120 has moved away from the top of sealing block 201, FIG. 2A. Hollow extrusion 114 is fitted with a sealed termination stop 201 in order to form therein a column of essentially trapped air as rule member 120 is raised up, or extended. Stop 201 thereby completes an air cushion container formed in the bottom of casing 108.

Since the inner rule member 120 is slidably mated for a smooth telescoping action within the base member 108, a column of trapped air 118 will be located between the bottom of base sole 102, FIG. 2A and the top of block 201. Sudden release of elevated inner rule member 120 would tends to compress air 118 and could conceivably lock member 120 in an extended position. I have perfected a smooth, slow dropping transition for inner rule 120 by my air cushion damper 125 of FIG. 2A.

Damper 125 includes the outer casing 108, the lower portion of inner rule 110, sole plate 102, sealed block 201 and an air bleed release 104. In any of the three alternate forms of damper configurations, as shown in FIG. 2A, 2B, and 2C an air release (such as groove 104 FIGS. 2A and 2B) is sufficiently small, relative to the amount of air 118 tending toward compression, so as to provide an air cushion damper 125 for my stick 100.

FIG. 2C is an example of a thin plastic or flexible sheet of material, rectangular in size and suitably fastened on the base of rule 120, that serves as an air damper without any visible opening therein. The air vent for FIG. 2C is a natural one by virtue of the material selected for sole 102. Thus, in FIG. 2C, a sheet of material 102 should be slightly oversized by say 10 to 20 thousandths of an inch just so that it forms a controlled release by its nature of air demonstrated symbolically by arrows 121. Material 102, FIG. 2C, may be, for example, made of material selected of rubber or plastic as appropriate for optimum sealing, sliding and cushioning.

As a practical damper example, let us say we have just completed a floor to ceiling measurement of about ten feet.

Release groove 104, causes an air cushion to be effected within base member 108 as air volume 118 is first compressed, and then is controllably released through groove 104 as depicted by arrows 121. (FIG. 2B shows a thin sole plate 102 equipped with a small air release hole 104A that is provided through the sole plate. That opening acts in the same manner as groove 104 and is an alternative damper form for air release as again shown by arrows 121.) In any event, member 120, in accordance with my invention, descends at a slow, safe, controlled rate because of air cushion damper 125.

I have determined that a wooden inner rule 120 made, for example, from straight grained mahogany or smooth grained poplar are very serviceable materials for inner rule 120. When properly milled, sealed and dimensioned, an opening for groove 104 or hole 104A in FIG. 2B can be adjusted for a cushioned, slow descent of rule 120. (Of course, there are many synthetic materials today, such as Corrolon, plastics or the like that would be equally as serviceable as material selected for inner rule 120.)

As far as the outer protective encasement material 114 is concerned, it likewise may be made of plastic, provided that it is selected from a durable plastic type. In my preferred embodiment, however, I have selected case members 107 and 108 from a hollow extruded aluminum box type beam member.

Figure 5:
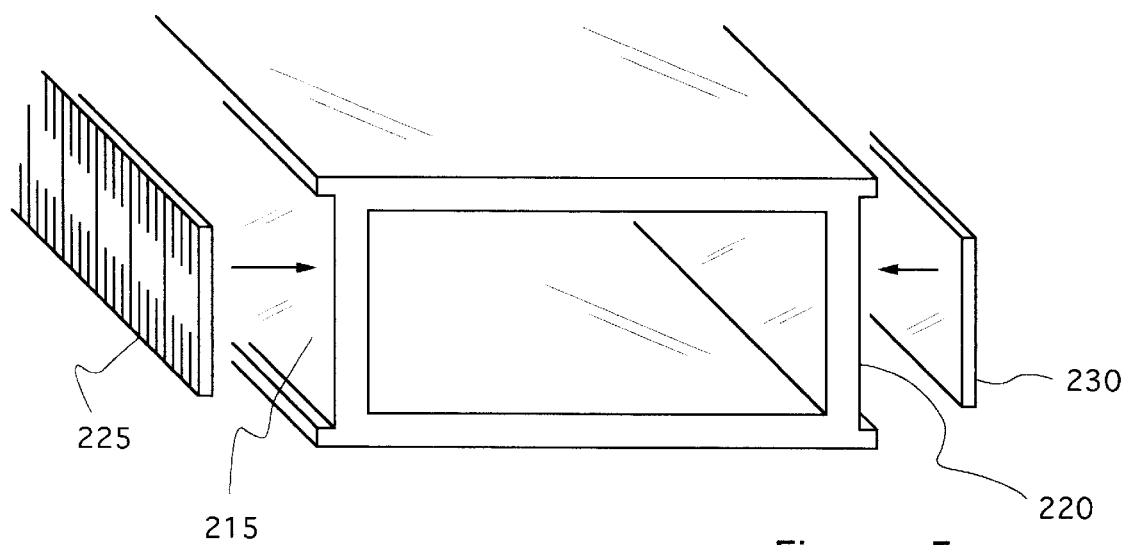
FIG. 5 is an orthographic view of the end of my protective encasement as fitted with side rulers for point to point measurement techniques.

Being aluminum, casing 114 is lightweight, strong and is easily milled, as required. FIG. 5 shows side grooves 215 and 220 which may be milled in the aluminum casing 114 or may be extruded therein during manufacture. FIG. 3C shows graduated scales running along the side edge of the case 114. Milled slots 215 and 220 are placed in the side edges of case 114 so as to receive ruled scales 225 and 230 in order to provide a continuous measurement scale that runs along the full length of the case.

Such graduated rules 225, 230 may take the form of thin separate strips or are also available in a pre-printed adhesive rolls of clear plastic or metalized material. When clear scales are employed against a wooden background, the product is both attractively packaged and extremely easy to read. As an alternative, of course, the scale markings of rules 225 and 230 can also be etched into the aluminum or suitably marked rules may simply be bonded to the flush edge surface of case 114.

Figure 3D:
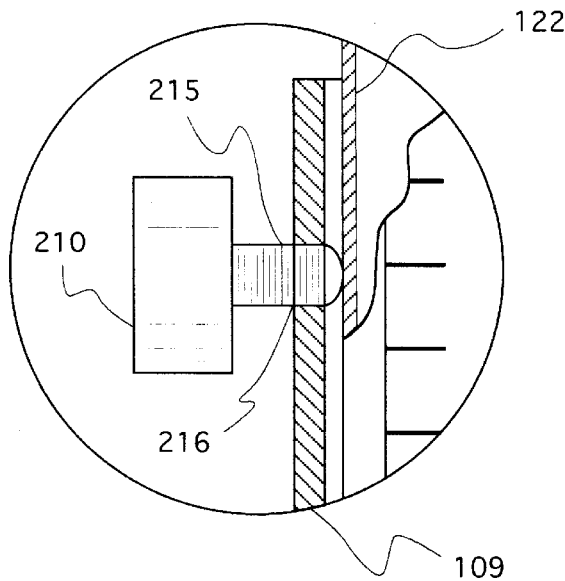
FIG. 3 includes FIGS. 3A, 3B, 3C and 3D which, respectively are front,an enlarged view depicting several operating modes of the measurement tool of my invention.
Figures 3B, 3C:
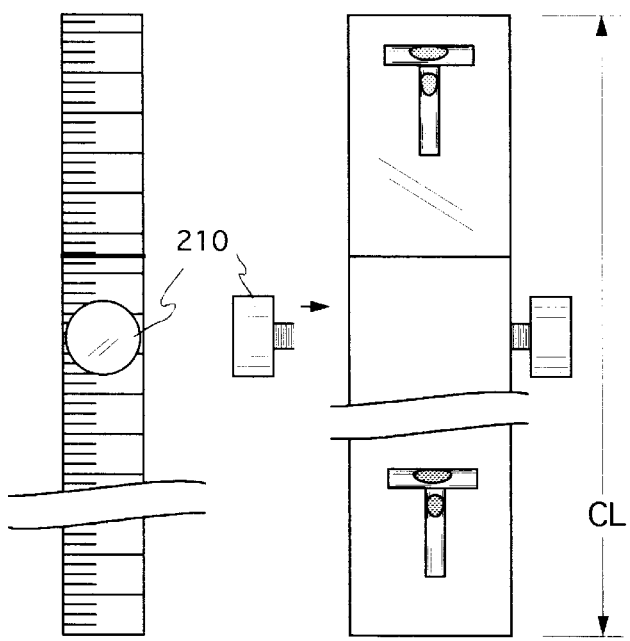
Figure 3A:
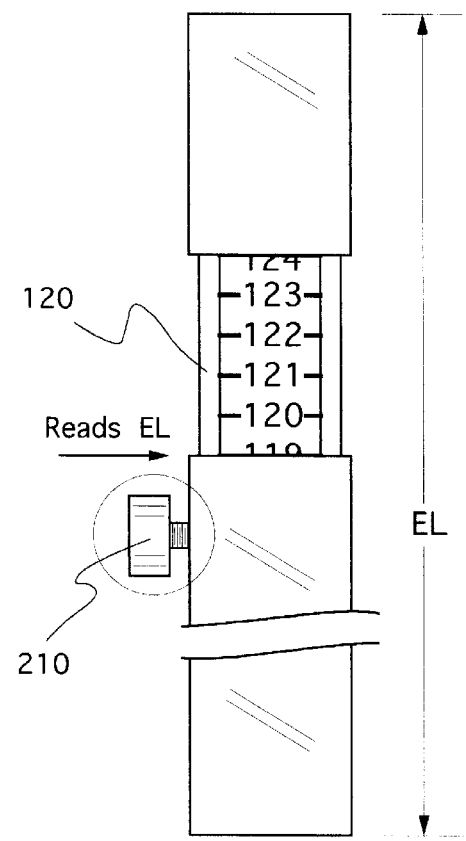

In FIG. 3, I have shown both a closed length "CL", FIG. 3B; and a partially extended length "EL", FIG. 3A. The invention provides the capability for either a right-handed operator or a left-handed operator depending upon the location of knob 210. Each option, in practical use, require the friction knob 210 to be located on the correct side for the preferred hand operation by the user. The stick 100 would be held vertically and inner rule 120 lifted into the proper elevation; and for a right-handed user knob 210 would be turned by the right hand in order to lock rule 120 in an elevated position. (Conversely a left hand operator requires knob 210 on the left hand side.)

As depicted in FIG. 3A, rule member 120 may be stopped at any position simply by turning a frictional knob 210 shown for a left handed operator. Careful adjustment of the knob 210 against an acrylic insert 129, FIG. 2C, can serve as a frictional drag for either extension or descent. An insert is also shown in the edge of rule 2120 in FIG. 3D.

FIG. 3D shows an enlarged view of the left-handed frictional knob 210 on an advance/retract threaded shaft 215 that is matingly threaded into a suitably tapped hole 216 through the side 109 of casing 108. A slight turn on knob 210 simply pressures the blunt end of shaft 215 against insert 129 that is seated in a side edge of rule 120. Shaft 215 may, of course, apply pressure directly against the side edge of rule 210 in the event an insert 129 is not employed. A small amount of pressure binds rule 120 within the telescoping housing of base section 108.

User applied knob pressure in one direction is a drag or lock, whereas a slight turn in the opposite direction releases rule 120. In any event the two working together—that is knob 210 and air damper 125 will assure that rule 120 achieves a slow regulated telescoping descent. Very little pressure need be applied by knob 210 in order to hold the rule 120 in an extended length position as shown, for example, in FIG. 3A.

FIGS. 4A and 4B show front plan views taken from opposite side of the rule 120 in order to explain the two different types of measurements—inside and offset—that may easily be read from my stick 100. In FIG. 4, the length of the bottom casing 108 is taken as length B and is the same in each of the FIGS. 4A and 4B. The side scales start at 1 inch and run upward the full length of the casing 114.

When a contractor or a surveyor desires to use the rule for an offset measurement, the rule is normally being viewed by a separate transit that seeks to determine a measurement number relative to a certain reference level point. For transit readings of less than about five and one-half feet or so, the transit can view the side scales, FIG. 3C, where the numbers on that scale start at 1 inch at the bottom and advance up to 64 inches or so in a closed condition.

For transit measurements greater than that amount, however, the extended scale of FIG. 4A must be used. The numbers on the rule face 110A, FIG. 4B, should take into account the length B for an offset measurement. For these higher readings, the following procedure must be followed.

First, rule 120 is extended almost to its fullest extension so that 124 inches is showing at the READ point on the front side (side A) of rule 120.

Second, rule 120 is locked into place at that point by friction knob 210. (Alternately, of course, a spring loaded pin located in casing 108 could seat itself into a matched locking opening on rule 120 for transit only work.)

Then, once locked in place at a fully extended position with number 124 or ten feet showing at the read location on FIG. 4B, stick 100 is turned around for use in an offset measurement.

One viewing the reverse side (side B) will see 64 and one-sixteenth inches (64 & 1/16") which is the starting measurement appearing on rule face 110B.

On that side B, the remainder of the scale increases numerically as 65, 66, etc. on up to a full ten foot or 120 inch reading by a transit user who is viewing the stick. Such numerical sequence starts low, i.e. at 64 and advances higher as one progresses up stick 100 to a scale value of 120 inches at the top. Please note that when used in an offset measurement the levels 145, FIG. 3B, are located on a side A casing location, and thus are in the proper position for viewing by the holder. Levels 145 assist in maintaining stick 100 in a plumb condition while being viewed by a transit.

In its inside measurement use, as shown, for example, in FIG. 4B the first reading to show above the READ line at the top of casing 108, as stick 100 is opened, is a 64 inch mark. And, in contradistinction from side B, the numbers on this side A run numerically down the scale length so that when the rule 120 is almost fully extended the number 64 is at the top and the numbers appearing at the READ line are 120, 121, 122, etc. for a ten foot inside measurement.

Figure 6:
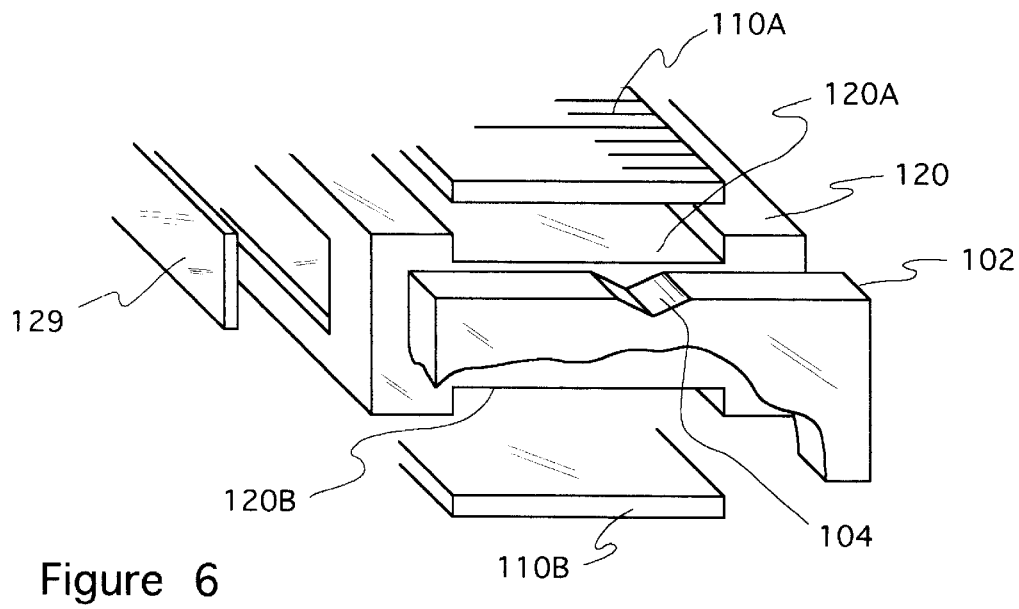
FIG. 6 is an exploded view of the bottom portion of the tool as shown in FIG. 5 and depicting opposed side graduated scales mounted in longitudinal grooves on the inner rule for two different type measurements as provided by my encased rule invention.

FIG. 6 depicts the manner in which the inner rule 120 is recessed on both sides and is fitted with inset scales 110A and 110B for these two different measurement requirements. As explained hereinbefore such scales can be thin plates, as shown, or may take the form of clear adhesive plastic, metalized rolled rulers, or material that has been bonded or otherwise etched onto the recessed faces 110A or 110B of inner rule 120.

While my invention has been described with reference to particular examples of a preferred embodiment, it is my intention to cover all modifications and equivalents within the scope of the following claims. It is therefore requested that the following claims, which define my invention, be given a liberal interpretation which is within the spirit and scope of my contribution to this art.

What is claimed is:

1. A self supporting measuring stick, said stick comprising;
    a hollow rectangular outer casing divided into a cap and a base section, with said cap section, upon opening, being slidable relative to said base section;
    an inner telescoping rule member connected to said cap section and slidably fitted into said base section so as to form a column of air within the base section when said stick is opened;
    graduated rule markings on said inner rule for providing a measurement; and
    an air cushion damper formed in said base section for slow air release of said column of air for a damped closure of said top cap and connected inner rule as said cap and base sections are telescopically brought together in a closed condition.

2. A self supporting measuring stick in accordance with claim 1 wherein said measurement includes an offset and a plane to plane-to-plane measurement as provided by two separate numbered scales on said inner rule, and said stick further comprises;
    opposed measurement scales having graduated numbers running numerically from a lower number to a higher number on said inner rule on one side thereof for said offset measurement; and
    numbers running in an opposite direction from highest to lowest on the reverse side of said inner rule for said plane to plane measurement.

3. A self supporting measuring stick in accordance with claim 1 wherein said measurement includes an offset measurement and a plane to plane measurement as provided by two separate numbered scales on said inner rule, and said stick further comprises;
    a pair of two-way levels mounted on an outer casing surface for determining that said stick is in a plumb condition when said measurements are taken by a user.

4. A self supporting measuring stick in accordance with claim 3 wherein said levels on said stick further comprise;
    one two-way level affixed to the upper cap section of the casing; and
    another two-way level affixed to the lower base section of the casing.

5. A self supporting measuring stick in accordance with claim 1 wherein said stick further comprises;
    a manual friction drag which bears against the inner rule and is adjustable from outside the lower casing for holding the inner rule at varied desired positions during measurements.

6. A self supporting measuring stick in accordance with claim 5 wherein the divided casing being involved in either survey or inside type measurements separates lengthwise; and said air damper of said stick further comprises for closure:
    means sealing the bottom of the base section to form a chamber of air therein when said inner rule is slidably fitted to be telescoped within the base section;
    a sole element telescopically fitted within the inside of said base casing section and attached to the bottom of said inner rule; and
    a sole air release means for venting away said air in order to provide a damped closure of said inner rule.

7. A self supporting measuring stick in accordance with claim 6 wherein said air damper of said stick includes said sole attached to the bottom of said inner rule and, for closure, further (comprises:
    an air release opening in said sole for venting said air to the atmosphere as said separated cap and base sections are telescopically brought together in a closed condition.

8. A self supporting measuring stick in accordance with claim 1 wherein said base section of said stick further comprises;
    a divided hollow aluminum extrusion of fixed length for receiving said inner measuring rule, with said extrusion serving as a protective encasement for said inner rule.

9. A self supporting measuring stick in accordance with claim 8 wherein the rule has recessed grooves on opposed side faces thereof and said stick further comprises;
    graduated scales placed in said recessed grooves and having exposed numbers which takes into account the fixed length of said aluminum casing section.

10. A self supporting measuring stick in accordance with claim 1 having graduates scales for measuring and wherein said stick further comprises;
    a pair of opposed longitudinal recessed grooves running the length of said inner rule, one each of said recessed grooves receiving one each of said graduated scales; and
    said air release comprises a passage communicating with said air thus allowing same to be automatically bled away from the casing along at least one of said recessed grooves.

11. A self supporting measuring stick in accordance with claim 1 wherein a junction is formed by the cap end of said casing and the upper end of said base section, which junction can become an awkward handling point that may pinch the user, and said stick further comprises;
    a frictional stop in combination with said air cushion damper for automatically and slowly lowering said inner rule; and
    said frictional stop is responsive to a manual operation by the user to hold the inner rule at any desired position during the descent of said inner rule.

12. A self supporting measuring stick in accordance with claim 11 wherein said damper further comprises;
    an air releasing groove in air communicating between the trapped column of air above the sealing means of said damper and at least one of said grooved recesses of the inner rule; and
    said air releasing groove being selected with an air passage size which slowly allows said inner rule to descend into said base section.

13. A self supporting measuring stick in accordance with claim 12 wherein said air damper further comprises;
    thin flexible sole material located at the bottom of the inner rule, with said flexible material naturally developing thereby an air vent.

14. A self supporting measuring stick in accordance with claim 1 wherein said inner rule further comprises;

a wooden inner rule selected for example, from straight grained mahogany or smooth grained poplar.

15. A self supporting measuring stick in accordance with claim 1 wherein said inner rule further comprises;

a casing formed from a hollow extruded aluminum member;

said casing having recesses in the sides thereof; and graduated scales for measurements recessed and seated in said grooves.

16. A self supporting measuring stick in accordance with claim 1 wherein said stick is useable by either right or left handed users, and further comprises;

a manually operable friction knob threaded through openings in either one or both of the casing sides; and a smooth hard material inset into one or both of said side(s) of the inner rule for bearing against the friction knob.

17. A self supporting measuring stick in accordance with claim 16 wherein said friction knob of said stick further comprises;

an advance/retract threaded shaft matingly threaded into said casing openings for placing sideways pressure against the side of said inner rule as said knob is advanced in order to bind the rule within the telescoping housing of said base section.

18. A method of measuring several diverse types of measurements by a self-supporting measuring stick, said method comprising the steps of;

encasing a double-sided inner rule within a hollow rectangular outer casing that is divided into an upper cap casing section that is slidable relative to a lower base casing section;

connecting to said cap section an inner telescoping rule member that is slidably fitted into said base section, which fit tends to contain a quantity of air in the base casing; and forming, upon stick closure, an air cushion which bleeds away said contained air in such a manner that the inner rule slowly descends into said base section.

19. A method of measuring several diverse types of measurements by a self-supporting measuring stick in accordance with claim 18, said method comprising the steps of;

placing standard graduated ruler markings on opposed sides of said inner rule; and arranging said ruler markings to measure at least two separate types of measurements.

20. A method of measuring several diverse types of measurements by a self-supporting measuring stick in accordance with claim 19, said method comprising the steps of;

arranging said numerical scales on opposed sides of said inner rule such that, for an offset measurement, the numerical scale on one side is a sequence which starts with a number indicating the lower casing length and advances numerically toward the top of the extended rule; and additionally arranging, on the reverse side of said inner rule for an inside measurement a numerical sequence that commences at the cap with a number indicative of the total casing length and progressively descends downward therefrom.

21. A method of measuring several diverse types of measurements by a self-supporting measuring stick in accordance with claim 19, said method comprising the steps of;

employing said stick in either survey or inside type measurements;

sealing the bottom of the base section to form a chamber of air therein when said inner rule is slidably fitted to be telescoped within the base section; and telescopically fitting within the inside of said base casing section and attached to the bottom of said inner rule a sole element; and venting away said air by an air release means which provides a damped closure of said inner rule.

22. A method of measuring several diverse types of measurements by a self-supporting measuring stick in accordance with claim 19, said method comprising the steps of;

placing an air release opening in said sole; and venting said air to the atmosphere as said separated cap and base sections are telescopically brought together in a closed condition.

23. A method of measuring several diverse types of measurements by a self-supporting measuring stick in accordance with claim 19, said method comprising the steps of;

dividing a hollow aluminum extrusion of fixed length into two separated section, one base section receiving said inner measuring rule, and a cap section serving as a protective encasement for said inner rule.

\* \* \* \* \*